July 14, 1942.　　E. D. RAPISARDA　　2,289,934
AGITATING AND PUMPING MECHANISM
Original Filed Dec. 4, 1939　　2 Sheets-Sheet 1

Inventor
EDWARD D. RAPISARDA
By George B. Willcox
Attorney

July 14, 1942.  E. D. RAPISARDA  2,289,934
AGITATING AND PUMPING MECHANISM
Original Filed Dec. 4, 1939  2 Sheets-Sheet 2

INVENTOR
EDWARD D. RAPISARDA
BY
George B. Willcox.
ATTORNEY

Patented July 14, 1942

2,289,934

UNITED STATES PATENT OFFICE 2,289,934

AGITATING AND PUMPING MECHANISM

Edward D. Rapisarda, Agawam, Mass., assignor to Baker Perkins Company, Inc., Saginaw, Mich., a corporation of New York Original application December 4, 1939, Serial No. 307,871. Divided and this application June 23, 1941, Serial No. 399,312

1 Claim. (Cl. 259—43)

This invention relates to improved agitating and pumping mechanisms for use in reservoirs for fluids, particularly materials which are viscous or heavy. Its object is to provide a simple and positive apparatus for continuously stirring liquid in a storage or conditioning tank while scraping and lifting it from the side walls and bottom thereof, and simultaneously withdrawing a stream of the material from the reservoir. This application is a division of my copending U. S. application, Serial No. 307,871, filed December 4, 1939, which matured into Patent No. 2,255,986, September 16, 1941, for apparatus for the handling, conditioning, and tempering of chocolate or like materials for coating confections.

This invention provides, for use in a reservoir having a circular bottom, an agitating and impelling device comprising an annular rim having a horizontal flange running closely adjacent the side wall of the reservoir above its bottom and a depending flange spaced inwardly of the periphery of the horizontal flange to run close to the bottom. The two flanges with the wall and bottom define an annular channel extending around the circumference of the reservoir. The rim is fastened by one or more spokes to a power-driven hub, at least one spoke being concave beneath and provided with means for scraping the reservoir bottom. The concave spoke or spokes communicate with the annular channel, so that rotation of the hub and rim causes material to be scraped from the bottom of the reservoir into the spoke and thence displaced outwardly into the channel. Stop means is provided on the rim, and suitable means in the channel is associated with one or more outlets therefrom, so that with rotation of the impeller, material in the annular channel is positively impelled through said outlet or outlets after the manner of a rotary vane pump.

Agitating blades of various forms and number, depending upon the nature of the material, the stirring action desired, and the shape of the reservoir above the rim, may be mounted upon the impeller structure to provide any desired combination of stirring and scraping actions. In cases where the bottom and/or the wall of the reservoir are tempered by heating or cooling, or where the material has solid particles in suspension, the layer of material next to the bottom or wall of the reservoir may be continuously removed or disturbed so that uniform temperature is maintained and the settling of solid particles is prevented. Other objects and advantages of the invention appear in the course of the following description.

Apparatus embodying the invention is illustrated in the accompanying drawings, in which—

Figure 1:
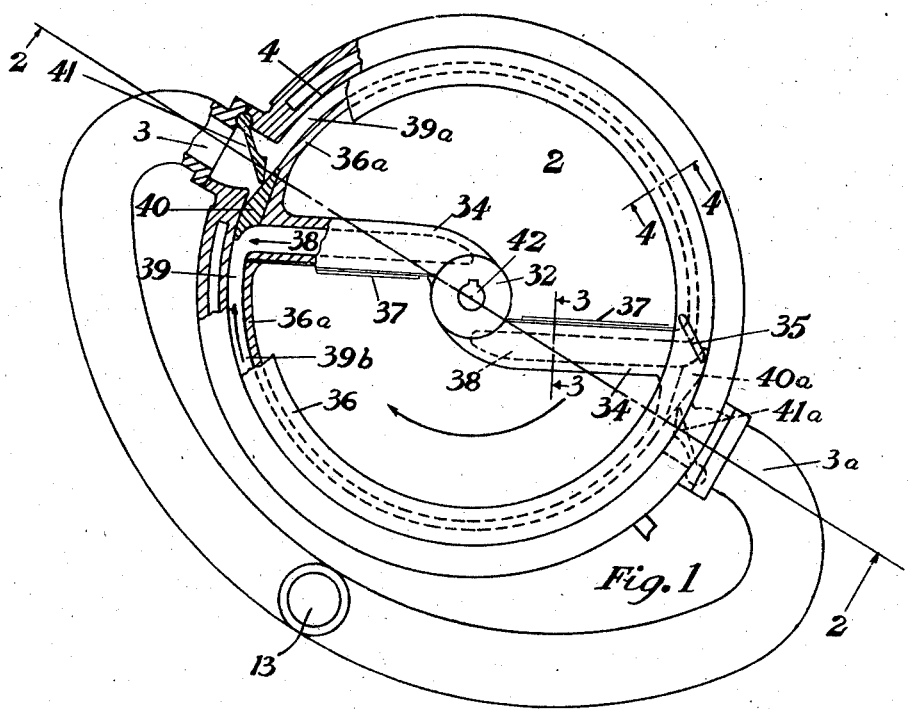
Fig. 1 is a top plan view, partly in section, of a reservoir and a rotary agitator and pump according to the invention.
Figure 2:
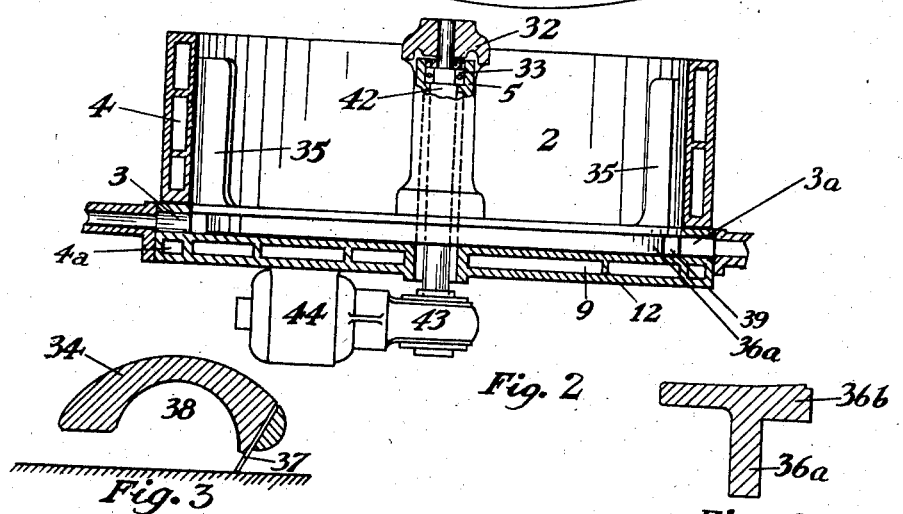
Fig. 2 is a vertical cross-section through the reservoir, taken on line 2—2 in Fig. 1, showing the rotor assembly in elevation.

Referring first to Figs. 1 and 2 of the drawings, a reservoir 2 having a circular bottom, shown jacketed for temperature control, contains the pumping apparatus of the invention. The latter urges the material continuously from the bottom of the reservoir, through outlets 3 and 3a to a conduit 13 leading to the point of use or storage of the material.

A cylindrical sleeve or hub 32 is journaled on bearings 33 at the top of a hollow center post 5. The hollow hub 32 at its bottom carries two arms or spokes 34 which preferably extend tangentially from the circumference of the hub. At the outer end of each spoke 34 a vertical scraper or paddle 35 is mounted to travel close to the inner wall of the reservoir. The blades are shown set at an angle to the inner receptacle wall 4 to stir the material inwardly to mix it with the central mass. The upright front edges of the scrapers also act to lift the material and spread it on the face of the wall where it is subjected to the heating or cooling action of the jacket.

Other upright blades or paddles may be mounted at other places on spokes 34, and horizontal blades may also be fixed to the hollow hub 32 to stir and impel the reservoir contents in various directions, as is well known in the mixing art.

Figures 3, 4:
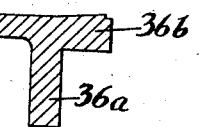
Fig. 3 is a vertical section through a spoke of the pump rotor, taken on line 3—3 in Fig. 1.
Fig. 4 is a vertical section through the annular rim of the rotor, taken on line 4—4 in Fig. 1.

At the outer ends of spokes 34 a circular rim 36 T-shaped in cross-section is mounted (see Fig. 4). The outer portion of its horizontal web 36b and its vertical web 36a co-operate with the side wall 4 and bottom of the reservoir to define an annular channel 39 extending circumferentially of the reservoir bottom. Each spoke carries at its rearward edge a scraper blade 37 (see Fig. 3) in scraping relation to the bottom of the receptacle. Each spoke is U-shaped in transverse section throughout its length to define an inverted channel 38, and its leading edge is spaced from the receptacle bottom. The U-shaped channel 38 of each spoke communicates at its outer end with the circumferential channel 39 of the rim through an opening in its vertical web 36a.

Ahead of the juncture of each channel 38 with the annular channel 39 a stop 40, 40a is fixed to the rim to close off the annular channel, dividing it into two semi-circular portions 39a, 39b. The leading face of each stop is beveled tangentially to the outer periphery of the vertical web 36a so that when it engages either of two hinged gate-valves 41, 41a at outlets 3, 3a it will displace them outwardly. Each gate-valve 41, 41a is pivoted vertically and is normally urged inwardly by spring means (not shown) so that it bears against the outer periphery of vertical web 36a to close off the semi-circular channel 39a or 39b and divert material from such channel into its associated outlet 3 or 3a.

The hub 32 and the agitator assembly comprising the spokes, the rim, and the associated parts, are driven by a vertical shaft 42 journaled axially in the hollow center post 5. At its lower end shaft 42 is coupled to a reduction gear 43 driven by a motor 44 of known kind.

The agitator and impeller assembly are driven clockwise in Fig. 1, causing the blades 35 to stir the material in the receptacle continuously away from the side wall. At the same time the scraper blades 37 on the spokes continuously remove the lower layer of liquid from the bottom of the receptacle and gather it into the U-shaped channels 38.

Rotation of the tangential spokes 34 causes the material in channels 38 to be deflected and urged continuously outwardly into the annular channel 39. As rim 36 and stops 40, 40a revolve they carry with them the outwardly displaced material in the channel 39 to outlets 3 and 3a where the gates 41 and 41a direct it through branch ducts into the discharge conduit 13.

While I have shown an agitator and pump assembly having two spokes 34 and two vertical agitator blades 35, the invention is not limited to this particular structure. An agitator and impeller embodying this principle may employ only one radial spoke or three or more, depending upon the consistency of the material being handled, the rotative speed, and the rate of displacement desired. Also, any desired number and style of agitator blades may be spaced at intervals around the rotor.

Figure 5:
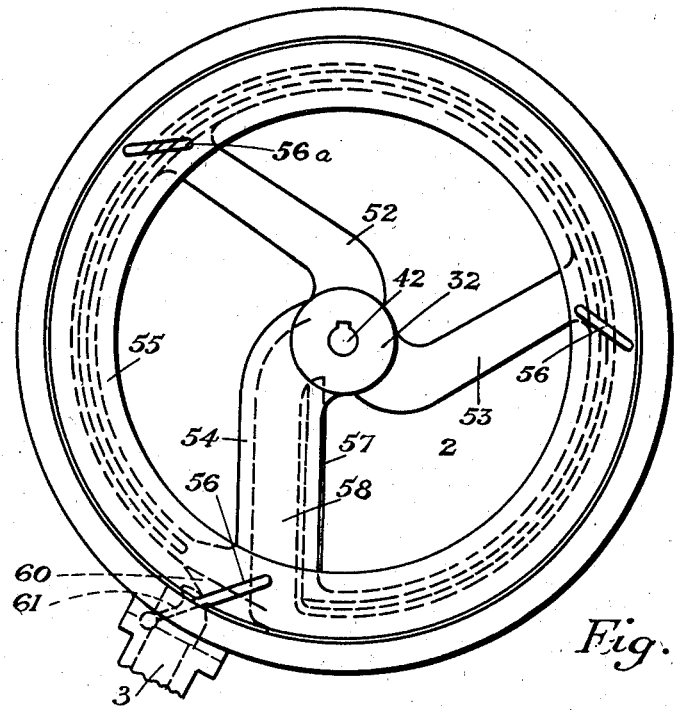
Figs. 5 and 6 are top plan and part-sectional side elevations, respectively, of a modified form of my agitating and pumping mechanism.
Figure 6:
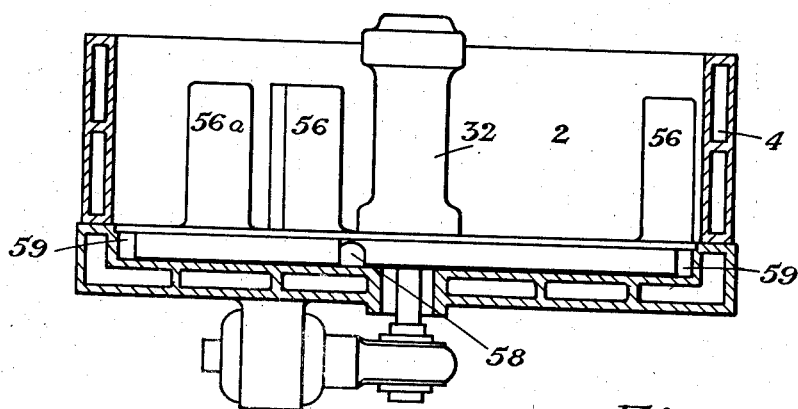

Figs. 5 and 6 show an agitator and pump assembly so modified. In operation it is similar to the apparatus of Figs. 1 through 4, but instead of the two spokes 34 of that machine, with their channels 38, the annular rim presents a channel broken at but one point and the agitator has but one channeled spoke 54 set tangentially to the central hub 32, which is journaled and driven in the same manner as in the machine first described. The complete agitator comprises also two spokes 52 and 53 which merely aid in locating and driving the rim 55.

Rim 55 carries a pair of scraper and agitator blades 56, which are directed so that clockwise rotation of the agitator assembly will deflect liquid inwardly away from the side walls of the tank, similarly to blades 35 of Figs. 1 and 2. In addition to these blades 56 a blade 56a is provided, similar in construction, but pitched in the opposite direction for the purpose of directing material outwardly and upwardly against the side wall of the container for effective heating or cooling when the level of material may be low.

The tangentially set spoke 54 carries a scraper 57 which engages the bottom of the reservoir. It is provided with an inverted channel 58 through which liquid flows to an annular passage 59 defined by the outer angle of the flanges of T-shaped rim 55 and the bottom and side walls of the tank.

The rim 55 carries a single block 60, identical with block 40 in Fig. 1, just ahead of the channeled spoke 54 to interrupt the circumferential continuity of the annular passage 59 in but one spot. The front face of block 60 is beveled to engage and displace outwardly a single normally closed gate 61 in the single outlet opening 3 of the reservoir. In construction and operation this agitator and pump assembly is essentially the same as that of Figs. 1 and 2, but since the annular chamber 59 extends through the entire circumference of the rim instead of being divided into two portions, the delivery from the pump through outlet 3 is interrupted by closing of the valve only once instead of twice each revolution. The non-pumping arms 52 and 53 perform a gentle agitating and lifting function which may be useful with certain materials and may carry additional stirring paddles, or they may be omitted if desired without affecting the operation of the pump.

Figure 7:
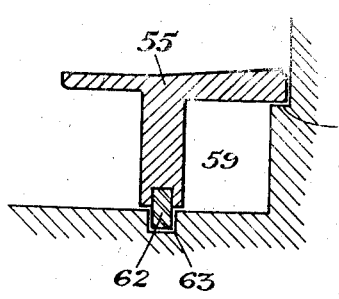
Fig. 7 is a vertical section through the rim of an impeller assembly according to the invention, showing added means for sealing off the annular channel from the reservoir.

Fig. 7 shows in vertical cross-section means for more positively sealing off annular channel 59 from the interior of the reservoir, as may be desirable in handling light non-viscous fluids. A vertical circular sealing strip 62 of bronze or other suitable material is fixed in the bottom of the vertical web of rim 55 and is slidably received in a corresponding circular way 63 in the bottom of tank 2. To supplement this bottom seal, a circumferential shoulder 64 may be cut in the side wall 4 of the tank to receive the lower peripheral corner of the horizontal flange of rim 55.

Having described the construction and operation of apparatus embodying my invention, what I claim and desire to secure by Letters Patent is:

In apparatus for the storing and delivery of fluid material, including a reservoir having a circular bottom and an upright wall angularly related thereto, in combination, an agitator and impeller apparatus journaled axially in the center of said reservoir, comprising an annular rim presenting substantially horizontal and vertical flanges which with said wall and bottom of the reservoir define an annular channel, a spoke connecting said rim to a driven hub, and presenting a lengthwise channel communicating with said annular channel of said rim, and means associated with said spoke for scraping material from the bottom of the container into said lengthwise channel, said spoke and its channel being arranged so that rotation of said hub, spoke, and scraping means impels material outwardly into the annular channel of said rim, stop means mounted on said rim formed to interrupt the annular channel and to carry the contents of said channel with the rotating rim, an outlet in said reservoir communicating with said annular channel, gate means in said reservoir at the said outlet co-operating with the rotating rim and said channel to intercept and deflect its contents through said outlet.

EDWARD D. RAPISARDA.